Patented May 18, 1954

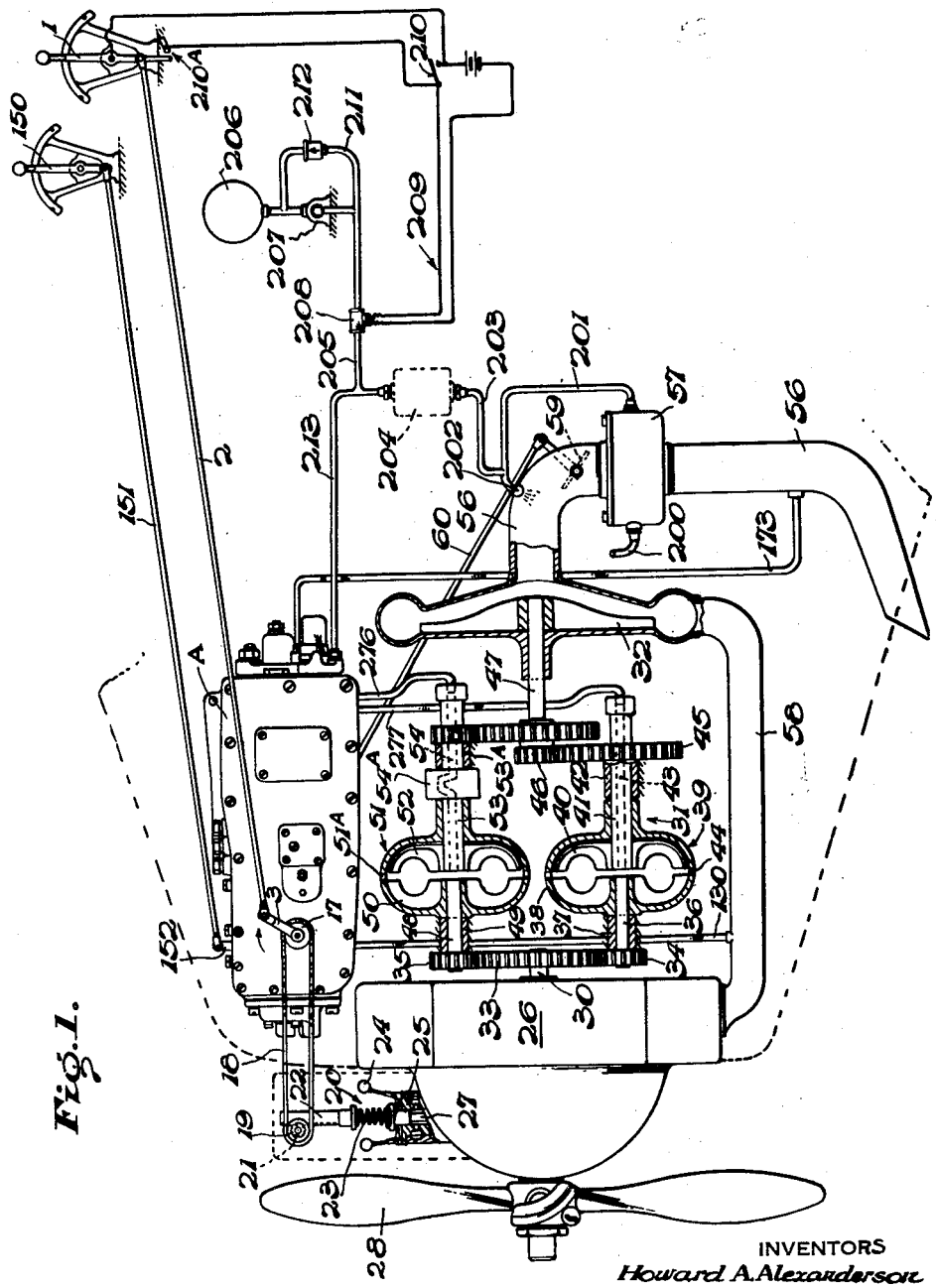

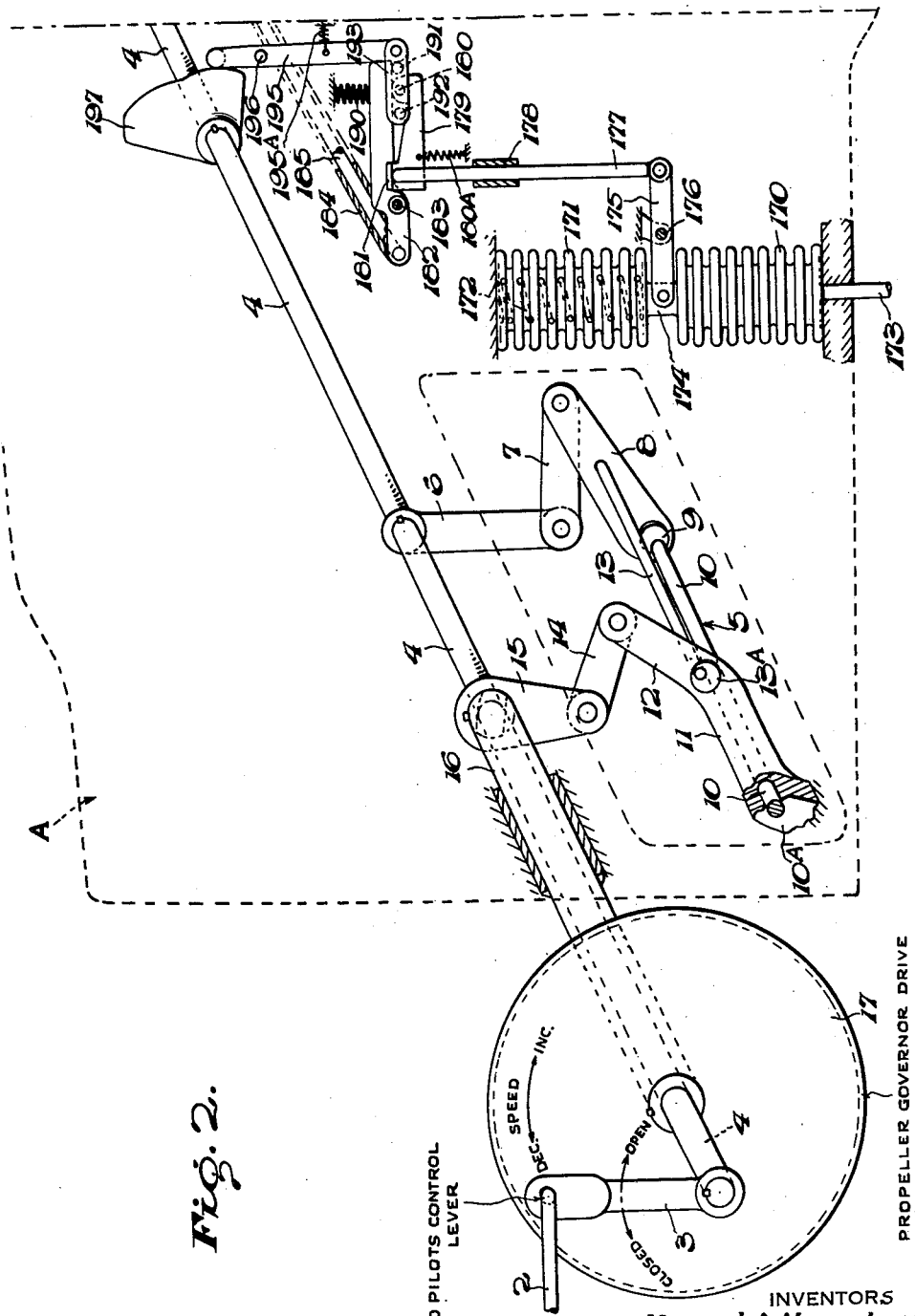

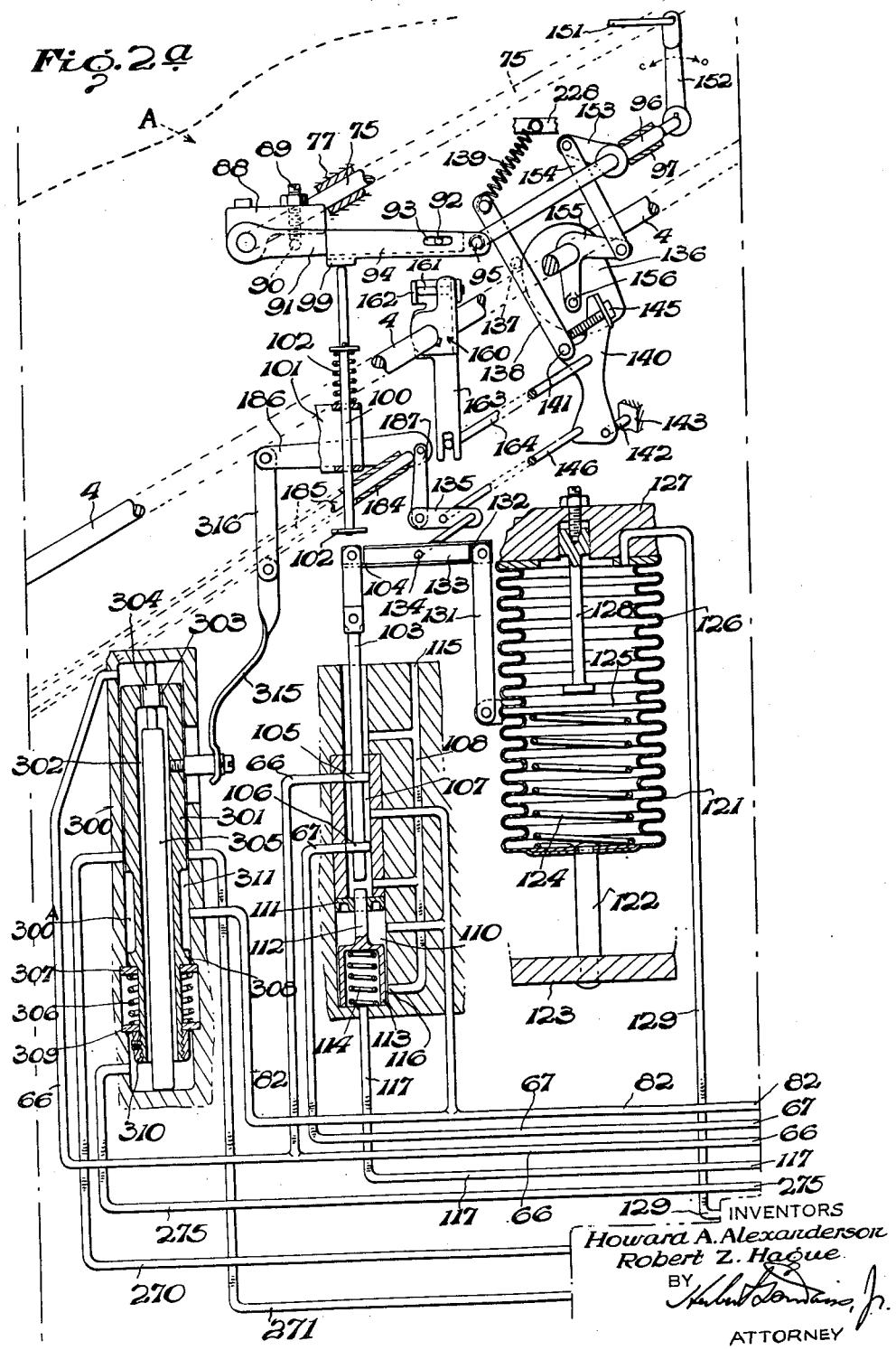

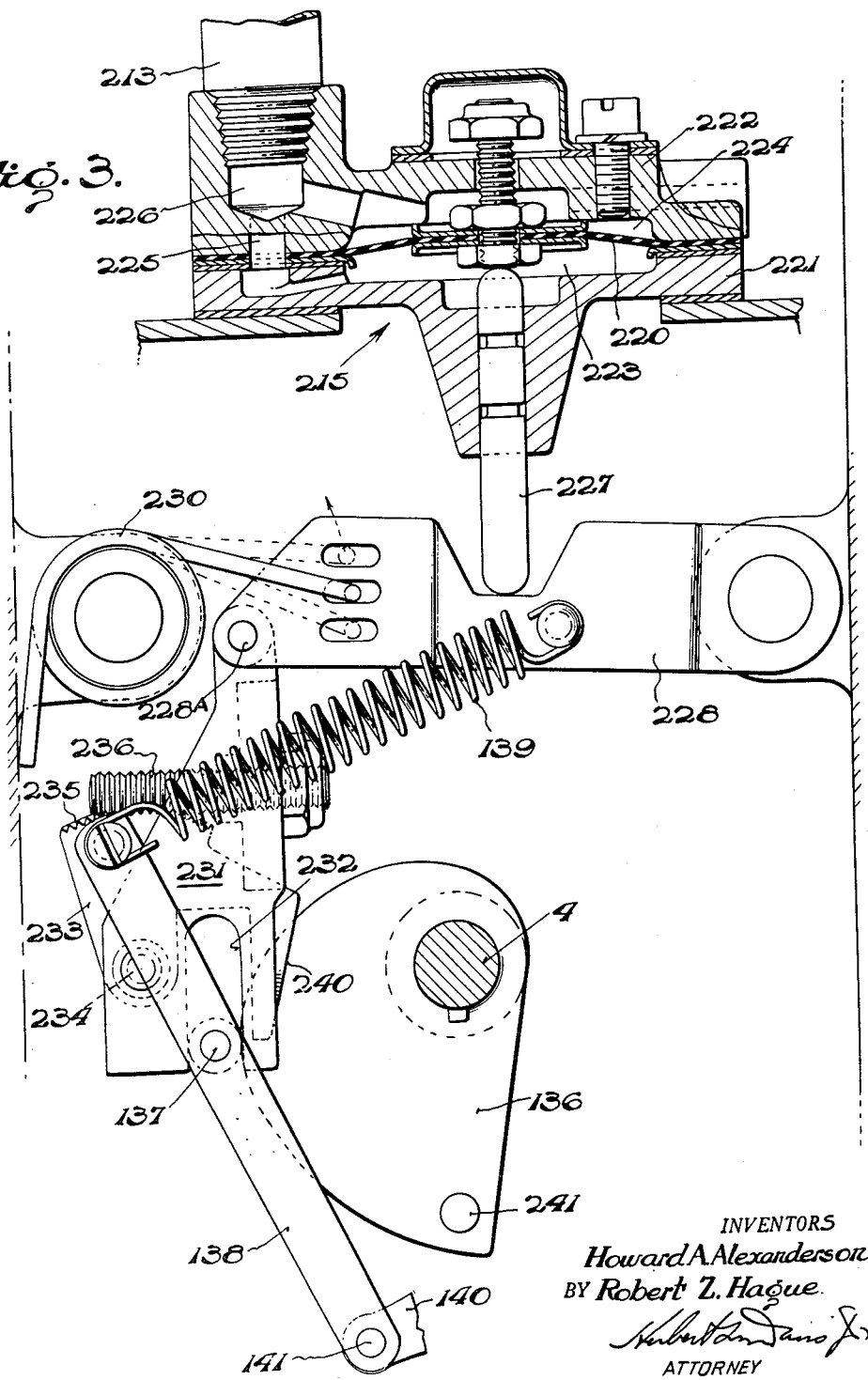

2,678,639

UNITED STATES PATENT OFFICE 2,678,639

PRESSURE RESET MECHANISM RESPONSIVE TO OPERATION OF ANTIDETONANT FLUID INJECTION SYSTEM

Howard A. Alexanderson, Hohokus, and Robert Z. Hague, Oradell, N. J., assignors to Bendix Aviation Corporation, Teterboro, N. J., a corporation of Delaware Original application May 29, 1945, Serial No. 596,472. Divided and this application December 20, 1950, Serial No. 201,729

26 Claims. (Cl. 123—25)

The present application is a division of U. S. application Serial No. 596,472, filed May 29, 1945, by Howard A. Alexanderson and Robert Z. Hague and relates to improved control devices for the power units of aircraft.

An object of the invention is to provide a novel selector linkage arrangement, whereby the datum of the boost control may be selected in accordance with two predetermined programs.

Another object of the invention is to provide a novel control mechanism for selecting in accordance with a first selected program the intake manifold pressure of the aircraft engine, including novel adjustable means for varying the relationship of the intake manifold pressure of the aircraft engine in accordance with a second selected program brought into operation by a predetermined operating condition.

During operation of the so-called "water" or "anti-knock" fluid injection systems for suppressing predetonation in internal combustion engines, an increase in the air inlet pressure of the induction system for the engine is permissible and desirable in order that greater engine power may be obtained than when such injection system is not in operation. Therefore, an object of the invention is to provide a novel regulator responsive to operation of such an injection system for effecting a predetermined increase in the air pressure in the induction system.

Another object of the invention is to provide a pressure reset mechanism in combination with novel means controlled by the pilot for modifying the pressure schedule corresponding to the position of a main control member without changing the setting of the main control member and for nullifying partly or entirely the effect thereon of the reset mechanism.

Another object of the invention is to provide a pilot operated auxiliary control member movable in one direction from a normal position to increase the pressure setting of a regulator to a value above the normal schedule and movable in the opposite direction from a normal position to decrease the pressure setting of the regulator to a value below the normal schedule while the main pilot operated control member remains in a set position and thereby providing pilot operative means to nullify the effect of an independently operable pressure reset mechanism, and to further provide means actuated by the movement of the main control member to certain high or low setting positions for nullifying the effect of the auxiliary control member.

Another object of the invention is to provide a novel linkage arrangement including a bell crank lever operated by the auxiliary control member upon movement in one direction to affect the cam follower of a main control cam in a sense to increase the pressure setting of the regulator relative to a normal schedule and upon movement in an opposite direction to affect the cam follower in an opposite sense to decrease the pressure setting of the regulator relative to the normal schedule and including a pressure reset mechanism acting upon the cam follower to increase the pressure setting under certain operating conditions subject to the overriding effect of the auxiliary control member.

Another object of the invention is to provide a novel selector plate and a cam follower pivotally connected thereto and normally contacting the contour surface of a selector cam under the biasing force of a spring which also serves to bias the cam follower into normal contacting relation with the selector plate in which the cam follower is arranged for adjustment out of contacting relation with the cam to vary a selected regulated value in one sense and in which the selector plate is arranged for adjustment out of contacting relation with the cam follower to vary the selected regulated value in an opposite sense and in which an actuating means is provided under control of a condition or fluid pressure responsive means for effecting actuation of the cam follower in the one sense, while pilot operated means may be provided to effect the actuation in the opposite sense to nullify the effect of the first mentioned actuating means.

Another object of the invention is to provide a novel regulator for effecting smooth control throughout the range of operation of the "antiknock" fluid injection system.

The above and other objects and features of the invention will appear more fully hereinafter from a consideration of the following description taken in connection with the accompanying drawings wherein one embodiment of the invention is illustrated by way of example.

In the drawings, wherein like reference characters refer to like parts throughout the several views:

Figure 1 is a diagrammatic view of the novel hydraulic control system;

Figure 2 is a diagrammatic view of part of the control mechanism shown in Figure 1;

Figure 2a is a diagrammatic view of a second part of the control mechanism;

Figure 3 is an enlarged view of the pressure reset mechanism.

Figure 2B:
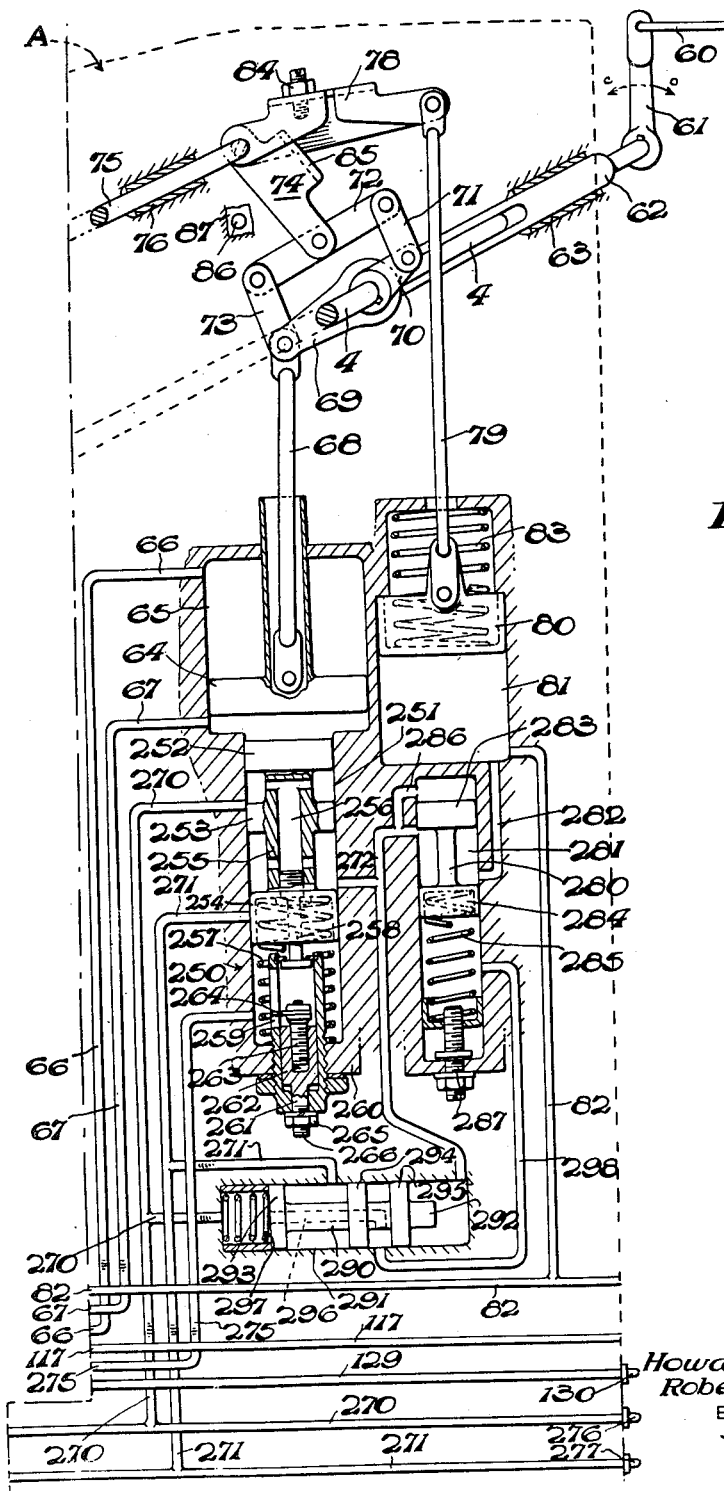
Figure 2b is a diagrammatic view of a third part of the control mechanism.

Referring to Figures 1 and 2 there is provided in the present invention a main pilot's control lever 1, which is connected by a link 2 to an operative control lever 3. As shown in Figure 2, the control lever 3 is keyed to a main control shaft 4 which extends into the main control unit indicated in Figure 1 by the letter A and shown diagrammatically in Figure 2.

Driven by shaft 4 is a propeller pitch governor selector mechanism indicated generally by numeral 5 and including an arm 6 keyed at one end to the shaft 4 and pivotally connected by a link 7 to an arm 8 rotatably mounted on a shaft 9 eccentrically affixed to one end of an adjustable pin 10. The pin 10 is mounted in a casing of the unit A part of which is shown at 10A.

There is further rotatably mounted on the pin 10 an arm 11. The arm 11 is bent at an acute angle at 12 and pivotally connected to one end of a link 14. The arm 11 is connected to arm 8 by an idler shaft 13. The idler shaft 13 extends from points intermediate the opposite ends of arms 11 and 8 and is affixed eccentrically to a cam 13A rotatably mounted in an arm 11.

The other end of link 14 is connected to an arm 15 which is keyed to one end of a tubular sleeve 16 rotatably mounted on the shaft 4. The opposite end of the sleeve 16 is keyed to a pulley 17 which as shown in Figure 2 is drivingly connected through lines 18 to an operating pulley 19 for adjusting a propeller pitch governor control indicated generally by the numeral 20.

The latter propeller pitch governor control may be of a suitable type well known in the art. The same is shown in Figure 1 as being of a type having the operating pulley 19 mechanically connected to a gear 21 and rack 22 for adjusting a governor spring 23 and fly-weight governors 24. The fly-weights 24 are pivotally mounted at one end of a shaft 25 drivingly connected through suitable gear means (not shown) to a drive shaft of an aircraft engine indicated by the numeral 26.

Slidably mounted in the shaft 25 is a valve 27 of conventional type, adjustably positioned under tension of the spring 23 and the counteracting biasing force of the centrifugally actuated fly-weights 24. The valve 27 is arranged to control the operation of a piston not shown which controls the pitch of a propeller 28 driven by the engine 26 in a manner well known in the art.

Thus the engine speed or R. P. M. of the engine 26 may be adjusted by varying through the pulley line 18 the tension of the governor spring 23 and the resultant position of the pilot valve 27. Moreover through the propeller pitch selector mechanism indicated by numeral 5 the relationship of pilot's control lever 1 travel to propeller pitch governor drive travel may be modified by adjustment of the eccentric pin 10 to accommodate production variations in the angular travel of propeller governors 20.

The engine 26 also drives through a shaft 30 and a two speed hydraulic coupling 31 a supercharger 32.

The coupling 31 includes a gear 33 keyed to the shaft 30 and driving high speed coupling gear 34 and low speed coupling gear 35.

The high speed coupling gear 34 drives through a shaft 36 rotatably supported by a bearing 37 one set of blades 38 of a hydraulic coupling 39 of conventional type. The opposite cooperating blades 40 of the coupling 39 are fastened to a driven shaft 41 rotatably supported by a bearing 42. The shaft 41 has a fluid inlet passage 43 leading into the coupling 39 for a purpose to be explained hereinafter. There is further provided in the fluid coupling 39 a fluid outlet port 44 through which the hydraulic fluid may be returned from the coupling 39 to a suitable sump not shown.

Keyed to the driven shaft 41 is a high speed gear 45 which drives through gear 46 the drive shaft 47 of the supercharger 32.

The low speed coupling gear 35 drives through a shaft 48 rotatably supported by a bearing 49 one set of blades 50 of a hydraulic coupling 51 of similar type to coupling 39 and having fluid outlet ports 51A. The opposite cooperating blades 52 of the coupling 51 are fastened to a driven shaft 53 rotatably supported by a bearing 53A. The shaft 53 has a fluid inlet passages 54 leading into the coupling 51. The latter passage is controlled by a valve 54A of a type arranged so that when the driven shaft 53 rotates at a speed greater than the driving shaft 48 the passage 54 is closed for a purpose which will be described hereinafter. The coupling and valve may be of a type described and claimed in U. S. Patent No. 2,400,307, granted May 14, 1946 to L. S. Hobbs et al. and assigned to United Aircraft Corporation.

A conduit 56 leads from an airscoop through a carburetor 57 into the air inlet for the supercharger 32. A conduit 58 leads from the air outlet of a supercharger 32 to the intake manifold of the engine 26. A throttle valve 59 controls the air inlet conduit 56.

The throttle valve 59 is controlled by a rod 60 operably connected, as shown in Figure 2b, to a throttle control arm 61.

The throttle control arm 61 is keyed to a shaft 62 rotatably mounted in a bearing formed in the casing of the control unit as indicated at 63. Rotatably mounted in the shaft 62 is one end of the shaft 4.

There is provided a servo piston 64 for operating the throttle 59 through shaft 62. The piston 64 is slidably mounted in a cylinder 65 having fluid pressure inlet passages 66 and 67 opening at opposite sides of the piston 64.

The piston 64 has a piston rod 68 pivotally connected at one end to the piston 64 and at the opposite end pivotally connected to an operating arm 69 formed integral with the rod 82.

Keyed to the pilot's control shaft 4 is a second arm 70 connected through a link 71 to one end of a walking beam 72. The opposite end of the walking beam 72 is connected through a link 73 to the arm 69.

Pivotally connected at a point intermediate the opposite ends of the walking beam 72 is one end of a lever arm 74 which is affixed at the opposite end to a shaft 75.

The shaft 75 is rotatably supported in bearing portions 76 and 77 formed apart of the control unit. Freely rotatable on the shaft 75 is an arm 78. The arm 78 is pivotally connected at the free end to a rod 79 which connects the arm 78 to a piston 80. The latter piston 80 is slidably mounted in a cylinder 81 into which opens at one end a passage 82 leading to a fluid pressure line such as oil under engine pressure. The piston 80 is normally forced under pressure of the oil in an upward direction as viewed in Figure 2b.

A spring 83 is positioned between the piston and the upper end of the cylinder so as to force the piston in a downward direction upon oil pressure failure, whereupon the arm 78 is forced in a clockwise direction. An adjustable screw 84 projects through the arm 78 and is arranged so as to engage an abutment plate 85 on the arm 74 in the latter event so as to restrain movement of the arm 74 in a counter-clockwise direction. A stop pin 86 projects from a portion 87 of the casing of the unit so as to restrain the arm 74 from movement in an opposite direction.

The pilot's control lever may then effect manual control of the throttle valve 59 through shaft 4, arm 70, link 71, walking beam 72, link 73, arm 69 and throttle control shaft 62.

The aforenoted manual control feature is described and claimed in the copending divisional application Serial No. 12,784, filed March 3, 1948, by Howard A. Alexanderson and Robert Z. Hague and assigned to Bendix Aviation Corporation.

The adjustable screw 84 is preferably adjusted so as to permit a small amount of angular travel of lever 74 between screw 84 and stop pin 86. During such manual operation of the throttle 59, lever arm 74 is driven between its restraining stops 84 and 86 rotating shaft 75.

At the opposite end of the shaft 75 there is affixed an arm 88 through which projects an adjustable screw 89. The screw 89 is arranged to engage a pin 90 which projects from an arm 91, supported on shaft 75. The arm 91 is freely rotatable on the shaft 75 and includes a second pin 92 which projects therefrom into a slot 93 formed in an arm 94 freely rotatable on a pin 95 projecting from one end of a shaft 96. The shaft 96 is rotatably supported in a bearing 97 formed apart of the casing of the control unit A and the shaft 96 may be rotatably adjusted as described and claimed in the copending divisional application Serial No. 129,132 filed November 3, 1949 by Robert Z. Hague and Howard A. Alexanderson and assigned to Bendix Aviation Corporation.

The arm 94 has an abutment plate 99 which bears upon one end of a plunger 100 slidably supported by bracket portions 101 and biased in an upward direction by spring 102. Lever arm 94 is driven by pin 92 of arm 91 so as to move plunger 100.

The plunger 100 is arranged so as to operably contact at 102 one end of a valve stem 103 which is biased under force of a leaf spring 104 in an upward direction. A valve stem 103 has valve members 105 and 106 arranged so as to control passages 66 and 67 respectively opening into valve chamber 107 and leading to chamber 65 at opposite sides of piston 64 so as to control the movement of the piston 64. The fluid pressure line 82 opens intermediate the openings of passages 66 and 67 to valve chamber 107. A fluid medium outlet or drain passage 108 also opens from the valve chamber 107 at the upper and lower sides of valves 105 and 106, respectively.

Another valve chamber 110 is provided separated from the valve chamber 107 by a sealing member 111. Projecting through the sealing member 111 is a valve stem 112. At the lower end of the valve stem 112 is mounted a cylindrical valve 113 having a spring 114 which tends to bias the valve 113 and stem 112 in an upward direction.

The fluid pressure passage 82 opens into the valve chamber 110 at the upper side of the valve 113 so that during normal operation the fluid pressure medium forces the valve 113 downward into the position shown in Figure 2a. The exhaust passage 108 has a port 115 opening into the housing of the control unit A and a port 116 opening into the chamber 110 but closed by the valve 113 when biased downward to the position shown in Figure 2a. A main drain passage 117 opens into the valve chamber 110. During normal operation the fluid medium is drained from the housing by suitable ports not shown.

When no pressure medium is available or upon oil pressure failure the drain valve 113 which is loaded by spring 114 is moved in an upward direction under force of the spring 114 serving two purposes. It causes the oil in the housing of the control unit A to drain to a predetermined low level by uncovering a drain port 116 so as to permit such drainage through port 115, passage 108, port 116, valve chamber 110 and through passage 117 to the fluid outlet. Secondly the spring 114 urges valve stem 112 upward into contacting relation with the lower end of the valve stem 103 so as to actuate the valve stem 103 in an upward direction.

During such fluid pressure failure, movement of the pilot's control lever 1 so as to move arm 70 in a counter-clockwise direction causes movement in a counter-clockwise direction of the lever arm 74 between its restraining stops 86 and 84 whereupon valve stem 112 under force of spring 114 causes servo valve to move from its neutral position as shown in Figure 2a, to an upper position so as to uncover the ports leading to passages 66 and 67 so as to permit movement of the throttle 59 manually. Similarly upon movement of the lever arm 74 in a clockwise direction between its restraining stops 85 and 86 as upon manual movement of arm 70 in a clockwise direction lever arm 94 actuates through plunger 100 the valve stem 103 in a downward direction opening the ports to passages 66 and 67. It will be seen from the foregoing that the manual operation of the servo valve 103 not only permits the opening of the passage 66 and 67 so that the manual operation of arm 69 and accordingly throttle 59 may be effected, but in the event slight pressure be available such movement of the valve 103 directs such slight pressure so as to effect piston 64 so as to assist the manual movement of the arm 68 and thereby assist in the manual control of throttle valve 59.

The latter feature of effecting manual control of the position of the throttle upon pressure failure is described and claimed in the copending parent application Serial No. 596,472, filed May 29, 1945, by Howard A. Alexanderson and Robert Z. Hague and assigned to Bendix Aviation Corporation.

*Automatic control of throttle*

When fluid pressure is available in excess of a predetermined value, the piston 80 is moved upward under the pressure medium from passage 82 against the force of spring 83. This latter action forces link 79 upward moving lever 78 in a counter-clockwise direction so as to permit lever arm 74 to move free of the restraining screw 84. Likewise upon such fluid pressure medium becoming effective the valve 113 is moved downward against spring 114 permitting the servo valve 103 to move free of the valve stem 112 under automatic control.

In order to effect the latter automatic control there is provided a pressure responsive bellows assembly including an evacuated bellows 121 supported at one end by a stud 122 carried by a portion 123 of the control unit A.

A spring 124 is positioned within the evacuated bellows 121 tending to expand the same. At the opposite end of the bellows 121 there is provided a movable plate 125 interposed between the bellows 121 and a second bellows 126. The bellows 126 is mounted at the opposite end by a portion 127 of the control unit A. An adjustable pin 128 projects into the bellows 126 from the portion 127 so as to limit the extent of contraction of the bellows 126 for a purpose which will be described hereinafter.

A passage 129 formed in the control unit leads from the interior of the bellows 126 to a conduit 130, shown in Figure 2b. The conduit 130, as shown in Figure 1, leads to the air intake manifold conduit 58. Thus the bellows 126 is controlled by the intake manifold pressure of the engine 26, which in turn is affected by the position of the throttle valve 59.

The movable plate 125 between the manifold pressure bellows 126 and evacuated bellows 121 is connected through a link 131, leaf spring 132, beam 133 and the leaf spring 104 to the servo valve 103. Beam 133 in the schematic drawing of Figure 2a contains at opposite ends the preloaded leaf springs 104 and 132 which permits deflection of the servo valve 103 by plunger 100 and valve stem 112 without excessively loading the bellows assembly. The beam 133 may, however, be made in the form of a solid beam and link 131 provided with a preloading mechanism which maintains the link 131 at a fixed length.

The selected pressure or datum of the bellows assembly may be changed by moving a pin 134 on which beam 133 is pivotally supported. Pin 134 is adjusted through operation of a whiffle-tree type of beam 135 controlled through operation of a pressure selecting mechanism, a cruise override lever; a hydraulic follow-up mechanism; and an altitude droop mechanism as will be described hereinafter.

It will be readily seen however from the foregoing that upon an increase in the intake manifold pressure above the selected pressure there will result an expansion of the manifold pressure bellows 126 causing the beam 133 to be shifted in a clockwise direction whereupon the servo valve 103 will be adjusted upward causing a pressure medium to be applied through the passage 66 to the upper side of the piston 64 and exhausting the lower side through passage 67. This action will cause the piston 64 to be adjusted downward so as to adjust the arm 69 in a counter-clockwise direction moving valve 59 of Figure 1 through rod 60 in a valve closing direction decreasing the intake manifold pressure until the valve 103 is returned to a neutral position. An opposite effect is of course produced upon the intake manifold pressure dropping below the selected value.

*Pressure selecting mechanism*

As shown in Figures 2a and 3 pressure selector cam 136 is rigidly keyed to a pilot's control shaft 4. Contacting the contour of the selector cam 136 is a cam follower 137 projecting from a follower lever 138. The follower lever 138 is loaded by an extension spring 139 and pivotally mounted on a selector plate 140 at pin 141. The selector plate 140 is pivoted on a pin 142 which projects from a portion 143 of the control unit A.

An adjusting screw 145 is mounted on the selector plate 140 and limits the clockwise rotation of lever 138. The selector plate 140 pivoted on the pin 142 transfers adjustment thereof to the whiffle-tree 135 through an interconnecting pin 146 projecting from the plate 140 and upon which the whiffle-tree beam 135 is pivotally mounted.

It will be readily seen from the foregoing that with spring 139 pivoting lever 138 at follower 137 in a clockwise direction into contacting relation with adjustment screw 145, the follower 137 and selector plate 140 act as a unit, and the pressure selection of cam 136 is transmitted to the bellows and valve linkage through pin 146, beam 135 and pin 134.

The manifold pressure bellows 126 is provided with the adjustable lock out stop pin 128 previously described. The latter pin 128 is adjusted to a low manifold pressure value below the minimum idling pressure for the engine 26, but above the minimum selected pressure. When pressures are selected by the pilot through operation of the control lever 1 which are less than the lockout setting pressure, the control unit A is locked into manual operation through the joint effect of the pin 128 and 134 causing the adjustment of the valve 103 upward tending to adjust the throttle valve 59 to a closed position. Thus through appropriate manual adjustment of the control lever 1, the throttle 59 may be manually controlled, as described and claimed in the copending parent application Serial No. 596,472, filed May 29, 1945, by Howard A. Alexanderson and Robert Z. Hague and assigned to Bendix Aviation Corporation. The latter lockout feature is described and claimed broadly in U. S. Patent No. 2,453,650, granted November 9, 1948, to Howard A. Alexanderson and assigned to Bendix Aviation Corporation. The lockout stop 128 also permits closing of the throttle 59 in the event of a broken evacuated bellows, since it provides means for placing the control unit into manual operation.

*Economy lever control*

The economy control, as described and claimed in the copending divisional application Serial No. 129,132, filed November 23, 1949, by Robert Z. Hague and Howard A. Alexanderson and assigned to Bendix Aviation Corporation, includes a pilot's economy control lever as indicated in Figure 1 by the numeral 150. The latter lever 150 is connected through a rod 151 to a control arm 152 keyed to the shaft 96 previously described and shown in Figure 2a. Keyed to the shaft 96 is an arm 153 connected by link 154 to a bell crank 155 freely rotatable on the shaft 4.

The bell crank 155 has a stud 156 projecting therefrom and arranged so that when the economy control lever 150 is rotated so as to move the arm 152 in a counter-clockwise direction to the "cruise" position, the economy bell crank 155 is rotated clockwise so that during operation in the cruising range of power stud 156 will raise lever 138 increasing the selected pressure setting and stud 156 will replace follower 137 as the pivot for the lever 138.

As the pilot's control shaft 4 is rotated in a counter-clockwise direction towards closed throttle, the cruise pressure setting must be reduced at an appropriate point and the pressure setting brought down to the normal selection. In order to effect the latter operation a collar 160 is keyed to the shaft 4 having an adjustable screw 161 arranged so as to contact an end 162 of a lever 163 freely rotatable on the shaft 4 so as to limit the rotation of lever 163 in a clockwise direction. Thus as shaft 4 is rotated in a counter-clockwise direction towards closed throttle, lever 163 is moved by screw 161 at a predetermined adjusted position of the shaft 4 in a counter-clockwise direction so as to apply a load to the selector plate 140 through a pin 164 projecting from the plate 140. As the shaft 4 is adjusted further towards closed throttle position, the plate 140 is adjusted in a clockwise direction about the pivot pin 142 so as to effectively reduce the selected pressure as the control shaft 4 is rotated towards closed throttle position.

When economy control lever 152 is rotated clockwise to the magneto check position, stud 156 contacts an upper projection of selector plate 140, causing the selector plate 140 to move in a clockwise direction and effectively locking the pressure selection at a low value and maintaining the throttle at its minimum position for purposes of checking the magneto.

The economy control feature is claimed broadly in the copending application Serial No. 581,878, filed March 9, 1945, by Howard A. Alexanderson and Harold A. Wheeler and assigned to Bendix Aviation Corporation.

*Altitude correction droop mechanism*

There is provided an altitude correction device or droop mechanism shown in Figure 2. The altitude droop mechanism serves in the single stage supercharger system disclosed (where no intercooling is provided) to prevent detonation at high altitude due to high fuel mixture temperature. At sea level a given supercharged intake manifold pressure may not cause detonation due to its relatively lower temperature, while at relatively higher altitudes the same supercharged intake manifold pressure may have a relatively higher temperature. The altitude droop mechanism reduces the selected manifold pressure with increase of altitude to within a safe operating range. Thus at high selected manifold pressures drooping in the selected intake manifold pressure is started at relatively low altitudes and the manifold pressure setting is decreased rapidly with change in altitude.

As lower manifold pressures are selected, drooping in the intake manifold pressure starts at a higher altitude and occurs at a slower rate until at low manifold pressures no correction or droop is required and constant manifold pressure control is provided.

The foregoing operation is effected through a bellows assembly including an altitude bellows 170 opposed by an evacuated bellows 171 including an internal spring 172. The bellows 170 is connected through a conduit 173 to the atmospheric or scoop pressure at the inlet to the conduit 56 as shown in Figure 1.

The position of the plate 174 between the bellows 170 and 171 is an indication of the prevailing atmosphere. This indication is transmitted by a lever 175 pivotally supported at 176 and connected at one end to the plate 174 and at the opposite end to a plunger 177. The plunger 177 is slidably mounted in a supporting bearing 178 and is arranged so as to actuate a cam lever 179 pivoted at one end on a fixed pivot 180 and having a plate 181 at the opposite end upon which the free end of the plunger 177 bears. A spring 180A biases the cam lever 179 towards the plunger 177. The spring 180A in actual practice may be in the form of a torsion spring about the pin 180.

A second lever 182 is pivotally supported on a fixed pivot 183. At one end of the lever 182 there is provided a sleeve like bearing 184 formed integral therewith and a pin 185 projecting through said bearing 184 and rotatably connected at one end to the lever 182.

The opposite end of the pin 185 is affixed to a follow-up lever 186 and transmits its motion to the selector whiffletree beam 135 through a link 187 pivotally connected at one end to the follow-up lever 186 and at the opposite end to the beam 135.

Lever 182 is spring loaded in a clockwise direction by a spring 190 which in actual practice may be in the form of a torsion spring about pin 183. The movement of the lever 182 in a clockwise direction is limited by a pin 191. The cam lever 179 transmits its motion to lever 182 through a pin 192 which is formed as an integral part of a link 193. The pin 192 may be adjusted along the surface of the cam lever 179 and between the levers 179 and 182 from a point coinciding with pivot pin 180 to a position at the left thereof. In the former position it will be readily seen that since the pin 192 of link 193 would be located at the pivot 180 of the cam lever 179 that motion of the altitude bellows could not transmit any motion to lever 182. However as the pin 192 is adjusted to the left of pivot 180 correspondingly greater movement will be imparted to lever 182.

In order to effect the latter adjustment of the pin 192 the link 193 is pivotally connected to one end of a cam follower arm 195 pivoted on a fixed pin 196 and bearing at the opposite end upon the surface of a cam 197 keyed to the main control shaft 4 under the biasing force of a spring 195A which in actual practice may be in the form of a torsion spring about the pin 196.

It will be seen from the foregoing that as the altitude correction cam 197 is rotated clockwise the cam follower lever 195 is pivoted at pin 196 so as to move link 193 and accordingly pin 192 into a position where the adjustment of cam lever 179 can be transmitted to lever 182. The cam shape provided at the upper surface of cam lever 179 determines the altitude at which motion will be transmitted to the lever 182 for manifold pressure setting. The shape of the cam lever is so arranged that the greater the intake manifold pressure the lower the altitude at which correction is effected and that at very low pressure settings no altitude correction is effected.

The feature of the altitude correction droop mechanism is described and claimed in the copending divisional application Serial No. 111,896, filed August 23, 1949, by Howard A. Alexanderson and Robert Z. Hague and assigned to Bendix Aviation Corporation.

*Injection system*

As best shown schematically in Figure 1, there is connected to the carburetor 57 a conduit 200 leading from a suitable source of fluid fuel for the aircraft engine. There is also provided a conduit 201 for injecting the fuel into the induction system through a nozzle 202. There is further provided a conduit 203 for injecting into the induction system through nozzle 202 supplemental or so-called "anti-knock" fluid medium such as water, water alcohol or other suitable fluid well known in the art for suppressing predetonation of the engine 26.

The conduit 203 is connected to a suitable metering device shown in dotted outline and indicated generally by the numeral 204. The latter metering device may be of a suitable type well known in the art for determining the rate of flow of the "supplemental" fluid.

A conduit 205 leads to the metering device 204 from a suitable source of "supplemental" fluid indicated by numeral 206. In the conduit 205, there is provided a pump indicated by numeral 207 driven by a suitable power means not shown. The pump 207 supplies the fluid medium under pressure to the metering device 204.

A valve 208 is provided in the conduit 205 between the pump and metering device 204 for "off" and "on" control of the "supplemental" fluid injection system. The control valve 208 may be of any suitable type, but is shown herein as of an electromagnet controlled type having an electrical control circuit 209 and switch 210 which is preferably mounted within the aircraft cabin for convenient operation by the pilot.

Thus the supplemental fluid injection system may be placed in operation by the pilot closing the switch 210 so as to effect the opening of the valve 208. Conversely, the valve 208 may be closed by opening the switch 210. As shown in Figure 1 the latter circuit may be also closed by the adjustment of the control lever 1 beyond a predetermined range of for example 63 degrees at which point a switch 210A shunted across the switch 210 may be closed by the control lever 1.

A by-pass conduit 211 and relief valve 212 is provided for recirculating the fluid medium from the pump outlet to the pump inlet at such times as the valve 208 is closed and the injection system is not in operation.

A conduit 213 is connected to the conduit 205 between the valve 208 and the metering device 204. The conduit 213 leads into the control unit A to a suitable pressure reset mechanism indicated in Figure 3 by the numeral 215 and to which the present application is directed.

As shown in Figure 3 the latter mechanism includes a spring loaded differential diaphragm 220 mounted between the casing portions 221 and 222 having chambers 223 and 224 formed at opposite sides of the diaphragm 220. The chamber 223 is open to atmosphere through a port 225 while the chamber 224 is open to the pressure from the fluid medium from the injection system through a port 226 into which opens the conduit 213 leading from the fluid injection system. The diaphragm 220 is operably connected to a pin 227 slidably mounted in the casing portion 221.

The pin 227 bears at one end on the diaphragm 220 and at the opposite end on a pivotally mounted arm 228 biased in an upward direction under force of a spring 230.

Pivotally connected at 228A is a plate 231. The plate 231 has formed therein a longitudinally extending slot 232 which opens at the lower end thereof. Positioned in the slot 232 is a cam follower 137 which projects from the follower lever 138 into the slot 232. The upper end of the follower lever 138 is connected by the spring 139 to the arm 228 and the follower 137 is biased by the spring 139 into contacting relation with the cam 136. As shown in Figure 3, the plate 233 is pivotally mounted on plate 231 at 234 and has suitable rack teeth 235 screw threadedly engaged by an adjustable screw member 236 so that the position of the plate 233 and accordingly a cam surface 240 provided on the plate 233 may be initially adjusted in relation to the plate 231. As shown in Figures 2a and 3 the spring 139 is connected at one end to the upper end of follower 138 and at the other end to arm 228 so that the spring 139 during normal operation tends to bias the follower 138 in a clockwise direction about the pin 141 and the cam follower 137 into contacting relation with cam 136.

It will be readily seen from the foregoing that upon operation of the fluid injection system the fluid medium under pressure entering the chamber 224 will bias the diaphragm 220 downward actuating the lever 228 in a counter-clockwise direction. The latter action will cause the plate 231 to be forced downward shifting the cam surface 240 relative to the cam follower 137 slidably mounted in the slot 232.

The cam surface 240 is so arranged that upon adjustment of the control lever to within the range for operation of the fluid injection system a pin 241 projecting from the cam 136 may contact the cam surface 240 and by appropriate adjustment of the control shaft 4 further increase the pressure setting of the unit during operation of the water injection system. The follower 138 is adjusted during the latter operation by the pin 241 acting upon the cam surface 240 so as to adjust the plate 140 in a counter-clockwise direction about the pin 142 through the follower 138 and thereby increase the pressure setting of the bellows 121 and 126.

*Supercharger speed control*

As the valve 103 is adjusted by the bellows assembly from its neutral position there is effected a corresponding adjustment of the piston 64 shown in Figure 2b. As the bellows calls for greater pressure the piston 64 is adjusted upward until the throttle 59 has been adjusted to the fully open position. Piston 64 is of such a size that the same effectively overcomes all throttle loads at a predetermined fluid or oil pressure differential of for example 20 p. s. i. When the piston 64 has opened the throttle 59 fully, if the manifold pressure still remains less than the setting, the fluid pressure differential from passage 67 to 66 will rise above the predetermined pressure value.

A metering piston-valve 250 is provided slidably mounted in a piston chamber 251 opening at one end into the chamber 65 and so arranged that the fluid pressure medium applied to the piston 64 through passage 67 may be also applied to one side of a piston head 252. The piston valve 250 includes the valve members 253 and 254 and valve stem 255 connecting the same. A passage 256 extends through the valve stem 255 and opens at opposite sides of the valve members 253. A spring 257 biases the piston-valve assembly 250 upward. A pin 258 projects downward from the valve 254 and is slidably mounted in a sleeve member 259. The member 259 is screw threadedly engaged in a portion 260 of the control unit A and is arranged so as to limit the upward movement of the piston valve 250. Mounted within the sleeve member 259 is a stem 261 having a nut portion 262 screw threadedly engaging a screw 263 locked from rotation by a portion 264 engaged in the member 259. The stem 261 is engaged at the outer end by nuts 265 so that the same may be readily locked in adjusted position. There is formed in the outer end of the stem 261 a cleft 266 for adjustment purposes.

By appropriate adjustment of the member 259 and screw 263 the limits of movement of the piston valve 250 may be readily determined.

The valves 253 and 254 are arranged to open in sequence the passages 270 and 271 to pressure medium supplied the valve 250 through pressure conduit 272 as the pressure supplied the chamber 65 through passage 67 exceeds predetermined differential values above the pressure supplied the opposite end of the valve through a passage 275, which as will be later explained equals the pressure in line 66.

The passage 270 opens into a conduit 276 which as shown in Figure 1 supplies fluid medium to the low speed coupling 51 through passage 54 and valve 54A. Similarly the passage 271 opens into a conduit 277 so as to supply fluid medium to the high speed coupling 39 through passage 43.

The hydraulic couplings 51 and 39 serve to couple the driving member 30 to the driven member 47 at varying speed ratios depending upon the rate of fluid flow supplied to the individual coupling which thus determines the slippage of the coupling and its speed ratio.

The metering piston-valve 250 is adjustably positioned by the aforenoted differential pressure so as to properly control the coupling ratio and accordingly the driving speed of the supercharger 32 so as to maintain a preselected intake manifold pressure in the conduit 58 as controlled by the servo-valve 103. By appropriate adjustment of the members 259 and 261 the minimum opening of the low speed passage 270 and the maximum opening of the high speed passage 271 may be conveniently adjusted.

In order to provide a substantially constant pressure in the passage 272 there is provided a reducing valve 280 including a valve chamber 281 having a pressure inlet passage 282 leading from the piston chamber 81 and opening in the chamber 281 at a point between parts 283 and 284 of the valve 280. A spring 285 biases the valve 280 in an upward direction tending to counterbalance the pressure applied at the upper end of valve 280 through a passage 286, while the valve portion 283 tends to open the passage 272 to the pressure medium as the valve 280 is biased upward by the spring 285 so as to increase the pressure applied through passage 286 to a predetermined constant value. The tension of spring 285 may be adjusted by means of a suitable adjusting mechanism 287 so as to vary the maximum flow through passage 270.

The aforenoted novel arrangement of the throttle piston 64 and coupling metering piston-valve 250 is described and claimed in the copending parent application Serial No. 596,472, filed May 25, 1945, by Howard A. Alexanderson and Robert Z. Hague and assigned to Bendix Aviation Corporation.

It has been found, however, that there is considerable variation in the back pressure in lines 270 and 271 thereby causing a metering error. Novel means to correct this condition, as described and claimed in the copending divisional application Serial No. 111,896, filed August 23, 1949, by Howard A. Alexanderson and Robert Z. Hague, include a shuttle valve 290 provided to connect the pressure in the passage 270 to the lower end of the valve chamber 281 during low speed supercharger operation and the pressure in the passage 271 to the lower end of the valve chamber 281 during high speed supercharger operation. Thus as back pressure increases the valve 280 will tend to increase the opening of the passage 272 so as to compensate for such increase.

The shuttle valve 290 is slidably mounted in a valve chamber 291 and includes a stem portion 292 having valve portions 293, 294 and 295 mounted thereon in spaced relation. A passage 296 extends longitudinally in the stem. One end of the passage 296 opens through the end of the stem 292 into the chamber 291 while the opposite end opens through the side of the stem 292 into the space between the valve portions 294 and 295. The passage 270 opens into the valve chamber 291 at the left of the shuttle valve so that the pressure in the passage 270 together with the force of a spring 297 biases the shuttle valve in the chamber 291 towards the right. At the opposite end of the shuttle valve 290 the pressure passage 272 opens into the valve chamber so as to normally counterbalance the force exerted by the spring 297 and fluid medium from passage 270 and positions the valve 290 as shown in Figure 2b.

In the latter position a passage 298 leading from the lower end of the valve chamber 281 opens into the valve chamber 291 between the valve members 294 and 295 so that the passage 270 is connected through passages 296 and 298 to the lower end of the reducing valve 280. There further opens into the valve chamber 291 the passage 271 which opens at a point between valve members 293 and 294 so that in the latter adjusted position of the throttle valve the passage 271 is disconnected from the valve 280.

However, when the pressure in passage 270 exceeds a predetermined value the valve 290 is shifted to the right so as to close passage 296 to passage 298 and open passage 298 to passage 271 so as to shift the reference pressure for the reducing valve 280 from that in passage 270 to the pressure in passage 271.

After the pressure medium has been supplied through passage 277 and 43 the high speed coupling 39 starts to over drive the low speed coupling 51, the low speed fluid feed line 54 is closed through operation of the rotary valve 54A permitting the coupling 51 to empty. Upon the rotary valve 54A closing the low speed pressure line 54, the pressure in passage 270 increases to a value sufficient to cause the shifting of the shuttle valve 290 previously described and the fluid pressure in the passage 270 maintains the shuttle valve 290 in the latter shifted position until such time as the high speed drive operation is terminated.

If desired a separate throttling valve may be provided for each flow control port. In this way a constant differential can be provided at the metering port feeding passage 270 and similarly a constant pressure differential can be supplied across the port feeding passage 271. The throttling may be provided either by throttling the fluid medium entering the metering valve or by feeding engine oil pressure into the metering valve and throttling the flow through passage 270 or 271 as required.

*Follow-up mechanism*

When valve 250 is moved from one position to another, there is an elapse of time required to flow the fluid medium into the hydraulic coupling 39 or 51 to bring the coupling to the particular slip condition required, and for the supercharger to cause the intake manifold pressure to rise to the selected value. This time lag tends towards instability and in order to provide a stabilizing action a follow-up mechanism 300, as shown in Figure 2a, has been provided in the hydraulic circuit of the metering valve 250.

The follow-up mechanism 300 includes a valve chamber 300A in which there is slidably mounted an adjustable valve-piston 301. Extending longitudinally in the valve-piston 301 is a passage 302 having a valve opening 303 at the upper end. The valve opening 303 is controlled by a valve member 304 mounted on a stem 305 extending longitudinally through the passage 302 and fixedly mounted at opposite ends of the valve chamber 301. There is provided a slight clearance between the defining surface of the valve opening 303 and the valve member 304 sufficient to permit a limited passage of the fluid medium or oil. The stem 305, as shown in Figure 2a, is positioned in spaced relation to the inner surface of the passage 302 so as to permit passage of the pressure medium such as oil upon opening of the valve opening 303.

The follow-up valve-piston 301 is centered by the action of a spring 306 which bears at one end upon an annular plate 307 slidably mounted within a portion of the valve chamber and engaging a shoulder 308 formed on the valve 301. Movement of the plate 307 is limited by another shoulder formed within the valve chamber. The opposite end of the spring 306 bears upon a similar annular plate 309 slidably mounted within a portion of the valve chamber but similarly limited by a shoulder portion formed within the valve chamber. The plate 309 is engaged by a nut 310 provided at the lower end of the piston-valve 301. The annular plates 307 and 308 are slidably mounted on the piston valve 301 and are biased in opposite directions into engagement with the shoulder 308 and nut 310, respectively.

An annular recess 311 is formed in the piston-valve 300 and opening into the valve chamber 300A at a point adjacent the recess is the fluid pressure passage 82. Passages 270 and 271 also open into the valve chamber but are closed by the piston-valve 301 upon the same being positioned in the neutral position shown in Figure 2a.

Opening at opposite ends of the valve chamber 300A are the passages 66 and 275. The passage 66 leads from the servo valve 103 while the passage 275 leads from the lower end of the metering valve 250 as previously explained.

The amount of follow-up action effected by the mechanism 300 is determined by the speed of movement of the metering valve 250, since the quantity of fluid medium or oil flowing through the lines 66 and 275 to and from the follow-up mechanism is determined by the displacement of the metering valve 250. The follow-up piston-valve 301 is biased to a neutral position by the action of spring 306 so that when metering valve 250 moves downward, follow-up piston-valve 301 due to the pressure acting on the lower end thereof moves upward and upon valve 250 moving upward the follow-up piston-valve 301 moves downward.

When the follow-up piston-valve 301 reaches a maximum permissible travel, the fluid medium or oil is by-passed through valve opening 303 which is opened by valve member 304.

During operation when only partial movement results, the oil is by-passed through the clearance between the surface defining the valve opening 303 and the valve member 304 allowing the follow-up piston valve 301 to be returned to a neutral position under the biasing force of spring 306.

When a great increase in the intake manifold pressure is required, the metering valve 250 will be subjected to a high pressure differential by the servo valve 103 and the metering valve will move downward rapidly causing the follow-up piston-valve 301 to move upward to its full extent. The latter action will not only open valve 303 but will also open the ports in the valve chamber 300A leading to the passages 270 and 271 to the pressure medium supplied the valve chamber 300A by passage 82 so as to permit the pressure medium to be valved into the high and low speed coupling passages 270 and 271, respectively, to provide acceleration of the couplings 39 and 51.

The follow-up action of the piston-valve 301 is transmitted by links 315 to follow-up lever 186. Follow-up lever 186 is pivotally supported by pin 185 which is freely rotatable in the tubular member 184 and lever 182. The follow-up lever 186 has the link 187 eccentrically connected thereto so as to transmit the motion of the follow-up lever 186 to the selector whiffletree beam 135. Thus upon the metering valve 250 moving downward to increase the manifold pressure the follow-up piston valve 301 moves upward causing the follow-up lever 186 to move in a clockwise direction about the pin 185 and moving the whiffletree selector beam 135 in a counter-clockwise direction about the pin 146 so as to decrease the pressure setting. Likewise upon the metering valve 250 moving in an upward direction to decrease the manifold pressure the follow-up lever is moved so as to increase the pressure setting and thereby providing novel follow-up action for preventing instability of the control unit A.

The foregoing novel follow-up means has been described and claimed in the copending parent application Serial No. 596,472, filed May 29, 1945, by Howard A. Alexanderson and Robert Z. Hague and assigned to Bendix Aviation Corporation.

*Operation*

It will be seen from the foregoing that there is provided a novel hydraulically operated control unit including a main control lever 3 and cruise override control lever 152. In addition there are provided the lever 61 for controlling the carburetor throttle 59 and a pulley 17 for connection to the propeller governor.

Motion of the main control lever 3 operates the propeller governor pulley 17 through a linkage mechanism 5 and positions the pulley 17 mechanically to the required speed setting. At the same time a cam 136 sets the pressure controlling element 133 to the desired intake manifold pressure, while a second cam 197 sets the altitude droop mechanism 170 so as to correct for droop in such intake manifold pressure due to change in the altitude of the aircraft. Further a linkage positions the throttle 59 through operation of the throttle servo valve 103 and piston 64 to a predetermined open position.

In the automatic operating range of the unit (above the idling pressure range determined by bellows stem 128) the throttle opening will not be sufficient to provide the manifold pressure selected. Consequently the throttle actuating servo 64 automatically opens the throttle 59 further to give the selected pressure. At a given position of the main control lever 3 the pressure and engine speed will be kept constant within the limitations of altitude and the variations provided by the altitude droop mechanism 170. Thus the main control lever 3 provides correlated selection of manifold pressure and engine speed.

The cruise override control 152 permits variation of the manifold pressure selection in the cruising range of pressures to provide maximum fuel economy for long range cruising. When the cruise override bell crank 155 is moved in a counter-clockwise direction, the pressure selection throughout the entire movement of the pilot's control is set below a predetermined value. This serves to lock the unit into manual operation through the effect of the limit stem 128 so as to permit ground checking of magnetos and reduction of selected pressure in an emergency, where it is desired to keep engine speed selection to a high value.

The engine power control A is arranged for operation with a variable speed supercharger drive including high and low speed hydraulic drives 39 and 51, respectively. The engine power control provides automatic control of the drive by operation of a flow control valve 250. In maintaining automatic control of the manifold pressure when the throttle 59 reaches the wide open position, the flow control valve 250 is adjusted by increased hydraulic pressure so as to cause the supercharger speed to increase until the selected manifold pressure is reached.

Further the control is provided with a novel device 215 for resetting the selected intake manifold pressure upon operation of the fluid injection system controlled by the position of the pilot's control lever 1. Through the latter novel control dry operation may be maintained throughout a predetermined operating range of lever 1 of for example, from 0° to a 63° angular position of the pilot's lever 1. Within a second predetermined range of for example from 63° to 72° the throttle lever 1 closes a switch 210A effecting operation of the injection system. During the latter operation the intake manifold pressure setting is increased to a predetermined value which may be adjusted by adjusting the lever 1 within the second predetermined range. However, in the event of injection fluid pressure or supply failure the intake manifold pressure is automatically reset to the maximum dry rating through operation of the device 215.

It should be further noted that when hydraulic pressure is available, the throttle is positioned by the hydraulic servo piston 64 even in the manual range.

Thus upon manual adjustment of the shaft 4 in a counter-clockwise direction past a predetermined critical low pressure setting position, the cam 136 positions the pin 134 so that the valve stem 103 is raised above its neutral position, while the pin 128 locks the bellows 126 out of operation in a pressure decreasing direction and is thus ineffective for returning the valve stem 103 to a neutral position.

The latter upward adjustment of the valve stem 103 opens port 66 to the pressure medium supplied through line 82 so that pressure is applied to piston 64 at the upper side tending to move piston 64 in a downward direction and actuating arm 69 in a counter-clockwise direction. Such counter-clockwise movement of arm 69 adjusts throttle arm 61 in a throttle closing direction and acts through interconnecting linkages 73, 72 and 71 so as to move arm 74 in a clockwise direction and thereby actuate the plunger 100 downward to return the valve stem 103 to a neutral position.

Further manual adjustment of the shaft 4 and the arm 79 in a counter-clockwise direction causes the arm 74 to be moved in a counter-clockwise direction so that plunger 100 releases valve stem 103 whereupon leaf spring 104 raises the same so as to permit the pressure medium to be applied to the upper side of piston 64 causing further counter-clockwise movement of the arm 69 so that the arm 74 once more resets the valve stem 103 to a neutral position and effects further adjustment of the throttle arm 61 in a valve closing direction.

Of course upon manual adjustment of the arm 79 within the automatic lock out range in a clockwise direction, there will be effected a clockwise movement of arm 74 past the critical neutral position causing valve stem 103 to be lowered whereupon piston 64 will actuate arm 69 in a clockwise direction moving arm 74 in a counter-clockwise direction so that the valve stem 103 will be returned to a neutral position and the throttle arm 61 adjusted in a valve opening direction. Upon the shaft 4 being adjusted in a clockwise direction past the limit of the automatic lock out range, the mechanism will once again be placed in automatic operation controlled by the pressure selector cam 136.

In the event of a hydraulic pressure failure the novel manually operable mechanical linkage 70, 71, 72, 73 and 74 is arranged so as to provide direct manual throttle control as heretofore explained. This linkage is particularly effective at the time of starting the aircraft engine. The manual throttle travel is sufficient to give normal power at take-off engine speed at sea level.

During normal operation of the engine the cruise override control 150 will be kept at its neutral position and both engine speed and manifold pressure will be controlled and selected together by the single pilot's control lever 1.

Constant manifold pressure and engine speed will be obtained at fixed pilot's control lever 1 positions up to critical altitude except as limited by the novel altitude droop device 170 and as momentarily effected by the novel follow-up device 300. The altitude droop mechanism serves to prevent the intake manifold pressure obtained through the control of the supercharger speed and throttle valve from exceeding values required for the safe operation of the engine without liquid injection at the prevailing altitude of the aircraft, while the pressure reset device 215 resets the selected intake manifold pressure and increases the safe intake manifold pressure limit for given altitude during the liquid injection.

Although only one embodiment of the invention has been described and illustrated in detail, it is to be expressly understood that the same is not limited thereto. Various changes may be made in design and arrangement of the parts illustrated, as will be apparent to those skilled in the art. For a definition of the limits of the invention, reference should be had to the appended claims.

We claim:

1. In a boost control for regulating the induction system of an aircraft engine having operable means for injecting a supplemental fluid for suppressing predetonation of said engine; a pressure reset mechanism comprising a membrane responsive to operation of said supplemental fluid injection means, a rotatable cam, a cam follower biased into contacting relation with said cam for changing the pressure setting of the boost control upon rotation of the cam, a plate operatively connected to said membrane and cam follower, said plate having a first member providing a cam surface, a second member projecting from said rotatable cam to engage the cam surface of said first member for changing the pressure setting of the boost control upon rotation of said cam within a predetermined maximum range during the operation of the supplemental fluid injection means, and said first member being adjusted by said membrane through said plate from an inceperative to an operative relation with said second member in response to operation of said supplemental fluid injection means.

2. The combination defined by claim 1 including said first member pivotally mounted on said plate, and adjustable means for varying the position of said first member relative to said plate.

3. In an aircraft internal combustion engine of the type including a carburetor for supplying a combustible mixture to said engine, operable means for injecting a supplemental fluid for suppressing predetonation of said engine, a supercharger for supplying air to the induction system of said engine, a throttle valve for controlling the induction pressure, a boost control for regulating the throttle valve, a manually rotatable shaft, a cam mounted on said shaft, a lever connected to said boost control for changing the pressure setting thereof, a cam follower carried by said lever, a spring biasing said lever and cam follower into contacting relation with said cam, and a reset mechanism for changing the pressure setting of said boost control through said lever in response to operation of said supplemental fluid injection system; said reset mechanism comprising in combination a membrane responsive to operation of said supplemental fluid injection means, a second lever operatively connected to said membrane, a spring biasing said lever to a first position during inoperation of said supplemental fluid injection means, a plate pivotally connected to the second lever and having a slot in which said cam follower is operatively positioned, a pin carried by said rotatable cam, a cam member affixed to said plate, said membrane biasing said second lever and cam member to a second position in response to operation of the supplemental fluid injection means, and said cam member when in said second position arranged so as to be operatively engaged by said pin to vary the pressure setting of said boost control upon adjustment of said rotatable shaft within a predetermined range.

4. For use in controlling the power output of an internal combustion engine having operable means for injecting a supplemental fluid under pressure for suppressing predetonation of said engine, and a main control member; means controlled by said main control member for regulating the intake manifold pressure of said engine, said last mentioned means comprising, in combination, a cam adapted to be positioned by said main control member, a cam follower, a selector plate to vary the setting of said regulating means and pivotally connected to said cam follower, a spring to bias said cam follower into contacting relation with said cam and selector plate so as to vary the position of said plate in accordance with said cam, a pressure reset mechanism including a membrane responsive to the supplemental injection fluid under pressure, a reset plate operatively connected to said membrane and cam follower, said reset plate being adjusted by the membrane from a first to a second position in response to the supplemental injection fluid under pressure, and an actuator member adapted to be positioned by said main control member for operatively engaging said reset plate when in the second position for actuating said cam follower relative to said cam for varying the pressure setting of said regulating means to a value above the normal schedule, and an auxiliary control member to actuate said selector plate out of contacting relation with said cam follower to nullify the effect of said reset mechanism and for decreasing the pressure setting of said regulating means independently of the position of said main control member.

5. For use in controlling the power output of an internal combustion engine having operable means for injecting a supplemental fluid under pressure for suppressing predetonation of said engine, and a main control member; means controlled by said main control member for variably regulating the intake manifold pressure of said engine, said last mentioned means comprising, in combination, a cam adapted to be positioned by said main control member, a cam follower, a selector plate to vary the setting of said regulating means and pivotally connected to said cam follower, a spring to bias said cam follower into contacting relation with said cam and selector plate so as to vary the position of said plate in accordance with said cam, a pressure reset mechanism including a membrane responsive to the supplemental injection fluid under pressure, a reset plate operatively connected to said membrane and cam follower, said reset plate being adjusted by the membrane from a first to a second position in response to the supplemental injection fluid under pressure, and an actuator member adapted to be positioned by said main control member for operatively engaging said reset plate when in the second position for actuating said cam follower relative to said cam for varying the pressure setting of said regulating means to a value above the normal schedule, and an auxiliary control member to actuate said cam follower out of contacting relation with said cam for increasing the pressure setting of the regulating means independently of the position of the main control member, and means adapted to be positioned by said main control member to actuate said selector plate out of contacting relation with said cam follower for nullifying the effect of said auxiliary control member upon the main control member being adjusted to a predetermined position.

6. For use in controlling the power output of an internal combustion engine having operable means for injecting a supplemental fluid under pressure for suppressing predetonation of said engine, and a main control member; means controlled by said main control member for regulating the intake manifold pressure of said engine, said last mentioned means comprising, in combination, a cam adapted to be positioned by said main control member, a cam follower, a selector plate to vary the setting of said regulating means and pivotally connected to said cam follower, a spring to bias said cam follower into contacting relation with said cam and selector plate so as to vary the position of said plate in accordance with a predetermined schedule, a pressure reset mechanism including a membrane responsive to the supplemental injection fluid under pressure, a reset plate operatively connected to said membrane and cam follower, said reset plate being adjusted by the membrane from a first to a second position in response to the supplemental injection fluid under pressure, and an actuator member adapted to be positioned by said main control member for operatively engaging said reset plate when in the second position for actuating said cam follower relative to said cam for varying the pressure setting of said regulating means to a value above the normal schedule, an auxiliary control member movable in one direction from a normal position to actuate said selector plate out of contacting relation with said cam follower to decrease the pressure setting of said regulating means to a value below the normal schedule, and said auxiliary control member movable in an opposite direction from the normal position into contacting relation with said cam follower and to actuate said cam follower out of contacting relation with said cam to increase the pressure setting of said regulating means to a value above the normal schedule.

7. The combination comprising a cam having a variable contour surface, a main control shaft for rotatably adjusting said cam, a cam follower, a plate pivotally connected to said cam follower, spring means normally biasing said cam follower into contacting relation with said cam surface and plate, first actuating means to move said cam follower out of contacting relation with the cam surface, condition responsive means to control the first actuating means, and second actuating means to move said plate out of contacting relation with said cam follower.

8. The combination defined by claim 7 including means operatively connecting said main control shaft to said first and second actuating means.

9. The combination defined by claim 7 including means operatively connecting said main control shaft to said first actuating means, and an auxiliary control member operatively connected to said second actuating means for effecting independent operation thereof.

10. The combination comprising a cam having a variable contour surface, a cam follower, a plate pivotally connected to said cam follower, spring means normally biasing said cam follower into contacting relation with said cam surface and plate, actuating means to move said cam follower out of contacting relation with said cam surface, fluid pressure responsive means to control the first mentioned actuating means, and other actuating means to move said plate out of contacting relation with said cam follower.

11. The combination comprising a cam having a variable contour surface, a cam follower, a plate pivotally connected to said cam follower, spring means normally biasing said cam follower into contacting relation with said cam surface and plate, actuating means to move said cam follower out of contacting relation with cam surface, fluid pressure responsive means to control the first mentioned actuating means, and other actuating means operable in one sense to move said cam follower out of contacting relation with said cam surface and operable in another sense to move said plate out of contacting relation with said cam follower.

12. The combination comprising a cam having a variable contour surface, a main control shaft for rotatably adjusting said cam, a cam follower, a first plate pivotally connected to said cam follower, spring means normally biasing said cam follower into contacting relation with said cam surface and first plate, a bell crank adjustable in one sense to engage and to move said first plate out of contacting relation with said cam follower and adjustable in an opposite sense to engage and to move said cam follower out of contacting relation with said cam, actuating means carried by said main shaft and effective upon rotation of the main shaft within a first minimum range to move said plate out of contacting relation with said cam follower while said bell crank remains adjusted in said opposite sense in engaging relation with said cam follower, and said cam effective upon rotation of the main shaft within a second maximum range to move said cam follower out of engaging relation with said bell crank while said bell crank remains adjusted in said opposite sense, a fluid pressure responsive membrane, a second plate operatively connected to said membrane and cam follower, a second plate adjustably positioned by said membrane from a first to a second position, and other actuator means operatively connected to said main shaft and effective upon rotation of the main shaft to within a third maximum range to operatively engage said second plate when in said second position for moving said cam follower relative to said cam.

13. For use in controlling the power output of an internal combustion engine having operable means for injecting a supplemental fluid under pressure for suppressing predetonation of said engine, and a main control member; a regulator controlled by said main control member for regulating the intake manifold pressure of the engine, said regulator comprising, in combination, means operated by said main control member for varying the pressure setting of said regulator in accordance with a predetermined schedule, an auxiliary control member, first means actuated by movement of the auxiliary control member in one direction from normal position to increase the pressure setting of said regulator to a value above the predetermined schedule, and second means actuated by movement of the auxiliary control member in the opposite direction from normal position to decrease the pressure setting of said regulator to a value below the predetermined schedule while the main control member remains in set position, other means actuated by the movement of the main control member within a predetermined maximum operating range to increase the pressure setting of said regulator to a value above the predetermined schedule, and a pressure responsive device for actuation by the injection fluid under pressure for transferring said last mentioned means from an operative to an inoperative relation upon a decrease in the operating pressure of the injection fluid below a predetermined value, and said second means operative by said auxiliary control member to nullify the effect of said last mentioned means.

14. Apparatus for controlling a supercharged internal combustion engine having operable means for injecting a supplemental fluid under pressure for suppressing predetonation of said engine, comprising a main manually operated control member, intake manifold pressure responsive means adjusted by said main manually operated control member in accordance with a normal schedule for automatically maintaining a selected engine fuel intake pressure, a second manually operable member, means actuated by movement of the second member from a normal position to vary the pressure setting of said regulator from the normal schedule, and fluid pressure responsive means affected by the injection fluid under pressure to transfer the control of said regulator from the normal schedule to a higher pressure schedule, and means actuated by movement of the second manually operable member to nullify the effect of said fluid pressure responsive means.

15. In a regulating system for induction pressure of an aircraft engine having a throttle and operable means for injecting a supplemental fluid for suppressing predetonation of said engine; the combination comprising a first rotatable shaft for pilot operation, a second rotatable shaft for positioning the throttle, a boost control responsive to the induction pressure of said engine for positioning the second shaft, a cam rotatable by the first shaft, a cam follower biased into contacting relation with said cam for changing the pressure setting of the boost control, a diaphragm responsive to operation of said supplemental fluid injection means, a plate operatively connected to said diaphragm and engaging said cam follower, said plate adjusted by the diaphragm from a first to a second position in response to operation of the supplemental fluid injection means, and means positioned by said shaft for operatively engaging said plate when in the second position for actuating said cam follower to vary the pressure setting of the boost control upon operation of the supplemental fluid injection means.

16. The combination defined by claim 15 including a member projecting from said cam, and a cam surface provided on said plate for engagement by said projecting member to vary the pressure setting of the boost control upon rotation of said cam during operation of the supplemental fluid injection means.

17. The combination defined by claim 15 including an auxiliary member for pilot operation, and means operative by said auxiliary member for nullifying the effect of said last mentioned engaging means.

18. Control apparatus for controlling the pressure maintained in the fuel mixture intake of a supercharged internal combustion aircraft engine in which means are provided for injecting an anti-detonant liquid into said intake under pressure, said apparatus comprising in combination, a pressure selecting means, an element responsive to engine intake pressure, motor means for controlling the intake pressure, said motor means under joint control by said element and said pressure selecting means, adjustable means for modifying the pressure selected by the pressure selecting means, means for limiting the selected pressure range of the pressure selecting means, a pilot's first manual control adjustable during flight of the aircraft, means operatively connecting said first control to said pressure selecting means, a pilot's second manual control adjustable during flight of the aircraft, means operatively connecting said second control to said pressure modifying and limiting means for adjusting the modifying and limiting effects thereof, and a pressure responsive device for actuation by the injection liquid under pressure to increase the selected pressure of said pressure selecting means.

19. In a regulator for the induction system of a supercharged aircraft engine of the type including a carburetor for supplying a combustible mixture to said engine, operable means for injecting a supplemental fluid for suppressing pre-detonation of said engine, and said regulator including a boost control means for regulating said induction system so as to maintain the pressure thereof at a predetermined constant value, means responsive to operation of said fluid injection means for operating said boost control means so as to change said predetermined constant value from a first to a second selected value, and manually operable means for adjusting said first and second selected values; the improvement comprising adjustable means for modifying the pressure selected by the manually operable means, adjustable means for limiting the selected pressure obtainable by the manually operable means, a pilot's manual control adjustable during flight of the aircraft, and means operatively connecting said control to said pressure modifying and limiting means for adjusting the modifying and limiting effects thereof.

20. Apparatus for controlling the intake pressure of a supercharged internal combustion engine comprising a member for actuating a throttle valve in the engine induction passage, a servomotor for operating said member, a device responsive to altitude pressure, a device responsive to the attainment of a certain pressure of a liquid injected into the engine induction passage, a manually positioned part, pressure selecting means under control by said devices and part, an element responsive to engine intake pressure and means under control by the pressure selecting means and by the element for controlling the servomotor.

21. Apparatus for controlling the intake pressure of a supercharged internal combustion engine comprising a member for actuating a throttle valve in the engine induction passage, a servomotor for operating said member, a device responsive to altitude pressure, an element responsive to engine intake pressure, a manually operable part, pressure selecting means operated by said part, means controlled by said device for modifying the action of the pressure selecting means so as to limit the obtainable pressure to a value less than can be demanded by manual operation, a second device responsive to the attainment of a certain pressure of liquid injected into the engine induction passage for nullifying the modifying action of the device first mentioned, and means under control by said element and by said pressure selecting means for controlling the servomotor.

22. The combination comprising, a cam having a variable contour surface, a cam follower, a plate pivotally connected to said cam follower, spring means normally biasing said cam follower into contacting relation with said cam surface and plate, and actuating means to move said plate out of contacting relation with said cam follower.

23. The combination comprising, a cam having a variable contour surface, a cam follower, a plate pivotally connected to said cam follower, spring means normally biasing said cam follower into contacting relation with said cam surface and plate, actuating means to move said cam follower out of contacting relation with said cam, and other actuating means to move said plate out of contacting relation with said cam follower.

24. The combination comprising, a cam having a variable contour surface, a cam follower, a plate pivotally connected to said cam follower, spring means normally biasing said cam follower into contacting relation with said cam surface and plate, actuating means to move said cam follower out of contacting relation with said cam, and other actuating means to move said cam and effective to move said plate out of contacting relation with said cam follower.

25. The combination comprising, a cam having a variable contour surface, a cam follower, a plate pivotally connected to said cam follower, spring means normally biasing said cam follower into contacting relation with said cam surface and plate, a bell crank adjustable in one sense to engage and to move said plate out of contacting relation with said cam follower and adjustable in an opposite sense to engage and to move said cam follower out of contacting relation with said cam, a shaft to move said cam, actuating means carried by said shaft and effective upon rotation of the shaft within a first minimum range to move said plate out of contacting relation with said cam follower while said bell crank remains adjusted in said opposite sense in engaging relation with said cam follower, and said cam effective upon rotation of the shaft within a second maximum range to move said cam follower out of engaging relation with said bell crank while said bell crank remains adjusted in said opposite sense.

26. An engine control system comprising pilot operative means for selecting a desired intake manifold pressure for the engine, means for controlling the intake manifold pressure, manifold pressure responsive means for adjusting said control means so as to maintain the selected manifold pressure, said selecting means including an adjustable plate, an element affixed to the plate, an adjustable member for engaging said element so as to limit the selected pressure.

References Cited in the file of this patent

UNITED STATES PATENTS

| Number | Name | Date |
|---|---|---|
| 2,453,653 | Alexanderson | Nov. 9, 1948 |
| 2,491,482 | Dolza et al. | Dec. 20, 1949 |
| 2,565,482 | Dolza et al. | Aug. 28, 1951 |